United States Patent [19]
Andrysiak et al.

[11] 3,746,085
[45] July 17, 1973

[54] METHOD AND APPARATUS FOR FORMING MULTI-BORE TUBING

[75] Inventors: Carl D. Andrysiak, Painted Post; Richmond W. Wilson, Corning, both of N.Y.

[73] Assignee: Corning Glass Works, Corning, N.Y.

[22] Filed: Feb. 5, 1971

[21] Appl. No.: 112,960

Related U.S. Application Data
[62] Division of Ser. No. 765,494, Oct. 7, 1968, Pat. No. 3,607,185.

[52] U.S. Cl.................................... 165/172, 65/184
[51] Int. Cl................................................. F28f 1/00
[58] Field of Search.................. 65/184, 191, 4, 87, 65/88; 165/172, 3, 1, 2, 145, 34, 35, 184, 144

[56] References Cited
UNITED STATES PATENTS
| | | | |
|---|---|---|---|
| 3,240,583 | 3/1966 | Holler | 65/88 |
| 2,961,976 | 11/1960 | Ooms | 165/34 X |
| 2,131,417 | 9/1938 | Danner | 65/184 |
| 3,291,584 | 12/1966 | Sheldon | 65/4 |

*Primary Examiner*—Charles J. Myhre
*Assistant Examiner*—Theophil W. Streule
*Attorney*—Clarence R. Patty, Jr. et al.

[57] ABSTRACT

Thin-walled multi-bore tubing having from about 10 to over 300 individual longitudinal bores is unitarily formed by drawing molten glass downwardly through a multiple bell orifice structure so as to provide a multiplicity of small diameter holes or bores having thin-walled partitions therebetween which produce an open frontal area of up to about 80 percent of the cross-sectional area of such tubing with a hole density of over 200 holes per square inch.

14 Claims, 11 Drawing Figures

Patented July 17, 1973 3,746,085

INVENTORS.
Carl D. Andrysiak
Richmond W. Wilson
BY
Burton R. Turner
ATTORNEY

Patented July 17, 1973

INVENTORS.
Carl D. Andrysiak
Richmond W. Wilson
BY
ATTORNEY

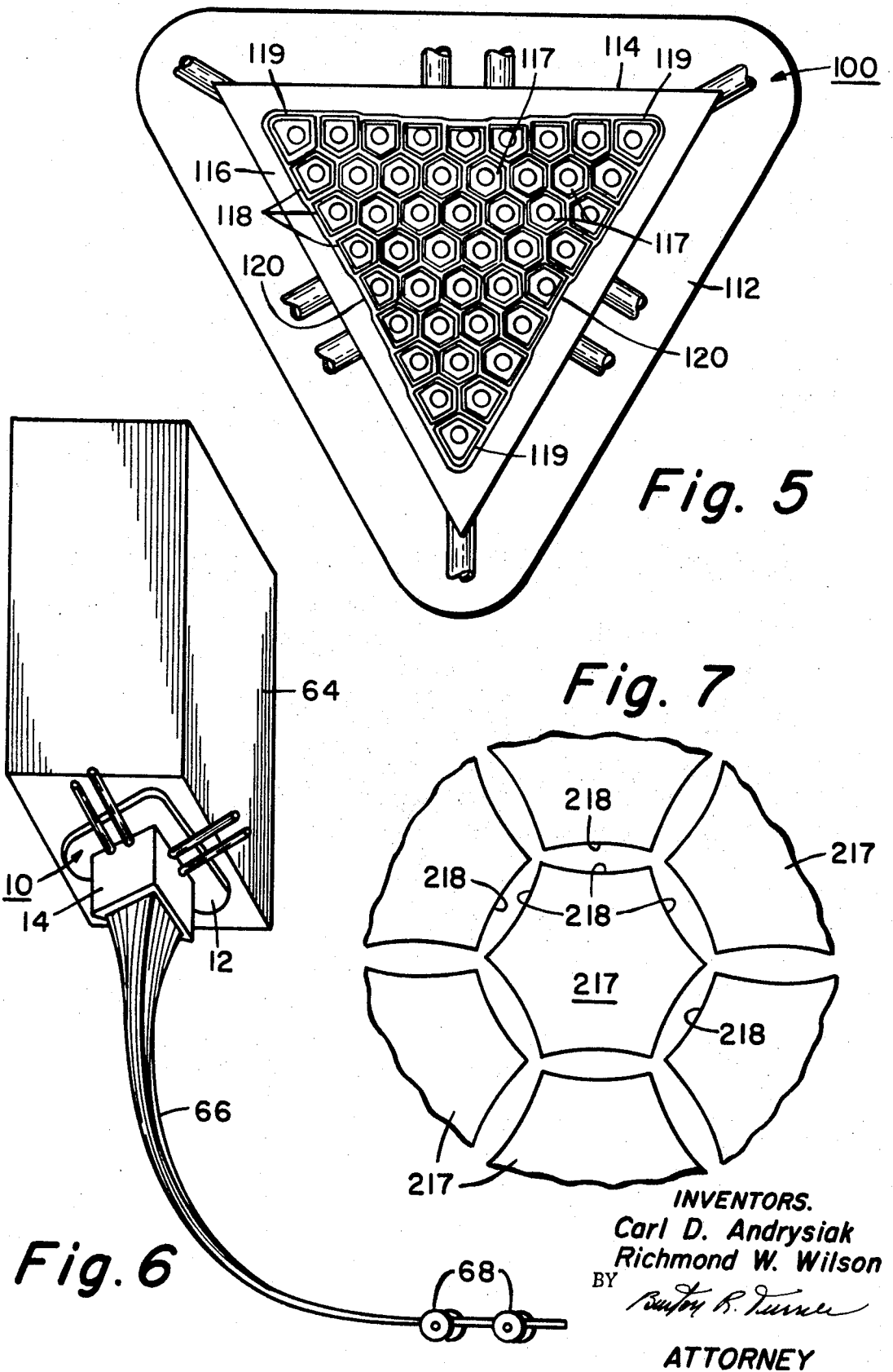

INVENTORS.
Carl D. Andrysiak
Richmond W. Wilson
BY

ATTORNEY

Patented July 17, 1973 3,746,085

INVENTORS.
Carl D. Andrysiak
Richmond W. Wilson
BY

ATTORNEY 3,746,085

METHOD AND APPARATUS FOR FORMING MULTI-BORE TUBING

This application is a division of our copending application Ser. No. 765,494, filed Oct. 7, 1968 now U.S. Pat. No. 3,607,185 granted Sept. 21, 1971.

BACKGROUND OF THE INVENTION

The formation of thick-walled glass tubing having a limited number, i.e., 2–4, of relatively large channels or bores has been known in the past.

The prior art is illustrated by U.S. Pat. No. 2,131,417 which discloses a partitioned hollow mandrel or forming member over which molten glass is poured to form glass tubing having two or three bores. Not only is the number of bores obtainable with such device limited by the structural capabilities of the forming member, but also the molten glass flowing along the walls of each bore combines with the glass flowing along the walls of an adjacent bore, or the outer surface of the forming member, to form multiple-bore tubing having double wall thickness about each bore. The patent merely relates to the formation of multiple-bore tubing by lip-feeding glass to a suspended forming member, and accordingly, the obtainment of uniform flow rates and wall thicknesses would be difficult if not impossible.

U.S. Pat. No. 3,240,583 discloses a further prior art method and apparatus for forming multiple-bore tubing by drawing glass upwardly between shaping devices disposed within the surface of a pool of molten glass. Such an arrangement, being an updraw, is generally slower in production, and requires definite control to prevent discontinuity of pull.

Therefore, although the prior art contemplated the manufacture of multiple-bore tubing, it was limited in its application to the manufacture of only a few bores with relatively thick walls therebetween. Such devices were incapable of producing uniform multiple-bore tubing having an open frontal area of up to 80 percent with a hole density of over 200 holes or bores per square inch of cross-sectional areas.

SUMMARY OF THE INVENTION

The present invention relates to multiple-bore tubing and the method and apparatus for forming such tubing having an open frontal area of up to 80 percent with more than 200 openings or bores per square inch. Such tubing is not only useful in the transfer of multiple fluids, but also in the manufacture of heat exchangers.

The multiple mini-bore tubing is formed by passing molten glass downwardly through an orifice having a plurality of uniformly spaced-apart bells which are connected to sources of fluid under pressure, such as air or gas. Each bell forms an individual bore in the multiple bore tubing, and consistently defined spacings between adjacent bells provides the control for uniform thin-walled tubing. The bells are preferably arranged so as to provide a plurality of concentric radially disposed bores with any internal bore being enclosed within the common walls of the outer bores.

A plurality of headers supply air under pressure to the various bells in such a manner so that a common pressure is supplied to all bells positioned substantially equally distant from the periphery of the orifice. Molten glass is fed through the orifice at a controlled rate and pulled downwardly and attenuated into tubing having a plurality of bores equal to the number of bells in the orifice, and having an outer configuration substantially conforming to the peripheral configuration of the orifice.

It has thus been an object of the present invention to provide an improved apparatus of forming multiple-bore tubing by drawing molten glass downwardly through an orifice to provide multiple mini-bore tubing having an open frontal area between about 40 and 80 percent with a transverse cross section exhibiting at least about 200 bores per square inch.

DESCRIPTION OF THE DRAWINGS

FIG. 5 is a bottom plan view of a further embodiment of an orifice structure.

FIG. 6 is a perspective view of an orifice structure connected to a feeder and illustrating the down-draw formation of multiple-bore tubing therefrom.

FIG. 7 is a fragmental plan view of a further embodiment of the invention illustrating a segment of an orifice having hexagonal shaped bells provided with scalloped or arcuately recessed edges.

DESCRIPTION OF THE PREFERRED EMBODIMENTS

Figure 1:
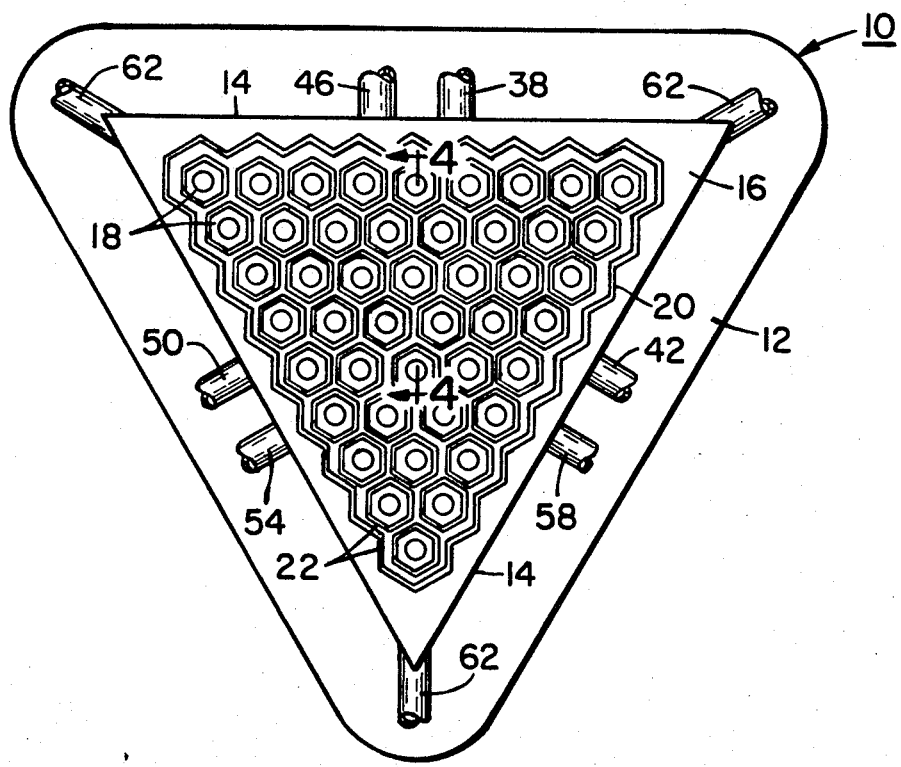
FIG. 1 is a bottom plan view of an orifice construction embodying the invention.
Figure 2:
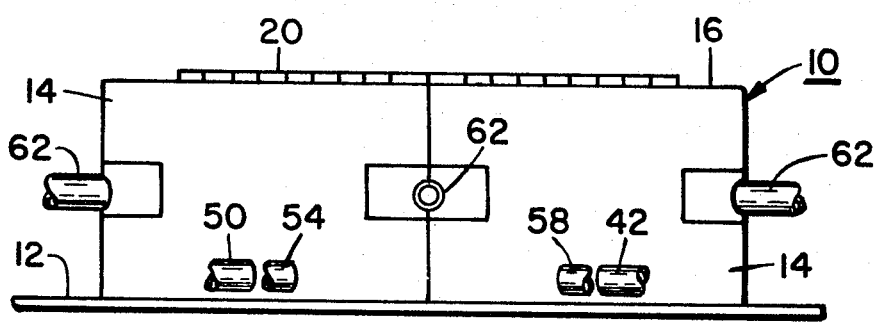
FIG. 2 is a side elevational view of the orifice structure shown in FIG. 1.
Figure 3:
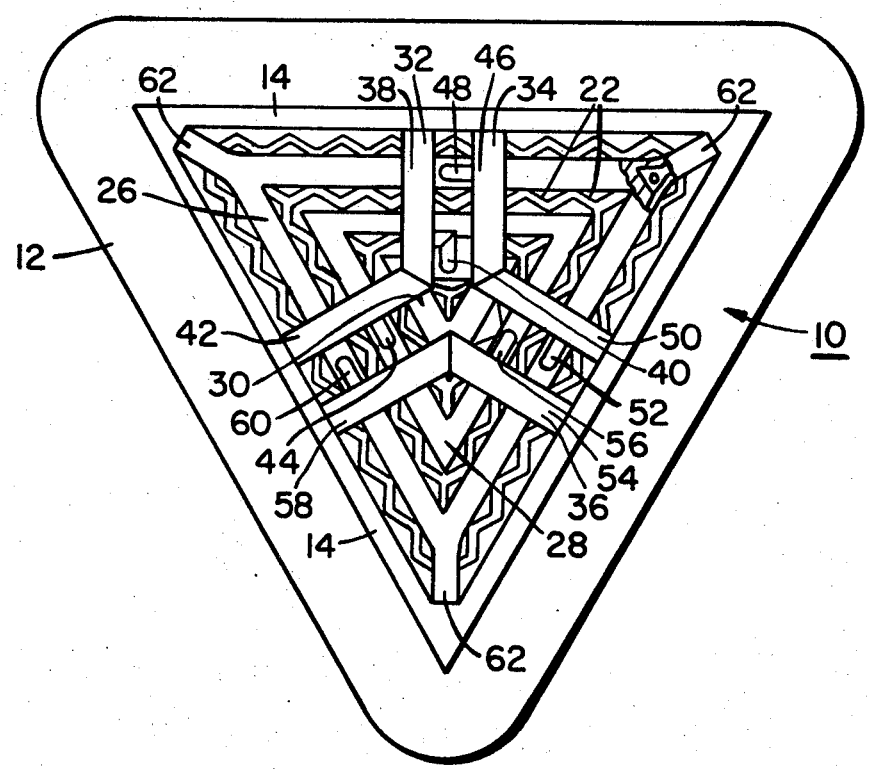
FIG. 3 is a top plan view of the orifice shown in FIG. 1.

Referring now to the drawings, and particularly FIGS. 1, 2 and 3, an orifice structure 10 is shown having an upper support flange 12, sidewalls 14, and a bottom orifice plate 16 surrounding a plurality of bells 18. The bottom orifice plate 16 may be provided with a ridge 20, which extends downwardly from the bottom of the plate and bounds the periphery of the discharge passage of the orifice, to help direct the glass downwardly from the discharge passage and prevent an outward wetting of the bottom plate.

The orifice structure is preferably fabricated as an integrally welded assembly from high temperature or refractory metals such as platinum-rhodium alloy, molybdenum, and titanium. A bell 18 is provided for each hole or bore to be formed in the multiple-bore tubing. As shown particularly in FIGS. 3 and 4, each bell 18 may be of a hollow conical shape with the bottom face or edge 22 having a polygonal configuration. Each bell 18 is shown supported by a small hollow bell shaft 24 which is connected to a header 26, 28, or 30. The headers 26, 28, 30 not only support the individual bells 18 by means of shaft 24 and maintain them in a predetermined spaced-apart orientation, but also supply air to the bells through the hollow bell shafts. A plurality of support beams 32, 34, 36 in turn support the headers 26, 28, 30 by transmitting load forces to the exterior of the orifice assembly, and also conduct a controlled supply of air from an external source to the various headers.

Each support beam is shown composed of two hollow leg sections which are closed at their inner ends and which extend outwardly through the sidewalls 14 of the orifice structure. Since the beams are closed at their inner ends, each leg is adapted to supply an individual air pressure to one of the headers. Support beam 32 has a leg portion 38 provided with an offset delivery tube 40 which supplies air to inner or central header 30. Another leg portion 42 of support beam 32 has an offset delivery tube 44 which delivers air under pressure to a midportion of one side of intermediate header 28. In a like manner, support beam 34 has a leg portion 46 provided with an offset delivery tube 48 which delivers air pressure to one side of outer header 26, and a leg portion 50 having an offset delivery tube 52 which supplies air to the midportion of another side of outer header 26. Also, support beam 36 has a leg portion 54 provided with an offset delivery tube 56 for supplying air under pressure to a midpoint of one side of intermediate header 28, and an additional leg portion 58 provided with an offset delivery tube 60 for supplying air under pressure to the midpoint of the remaining side of outer header 26.

When manufacturing triangular shaped tubing, it has been found that improved dimensional control can be obtained by providing a common air supply to the corner bells, which supply is separate from that provided to the headers proper. As shown particularly in FIG. 3, supply tubes 62 provide air solely to each of the corner bells 18, since the ends of each side of outer header 26 are closed-off to provide separate passageways. When utilized, the supply tubes 62 are connected to a common source of air under a predetermined pressure to supply equal pressures to the corner bells.

Leg portions 34, 50 and 58 are also connected to a common source of air under a predetermined pressure to supply equal pressures to midpoints of the various sides of outer header 26. In a like manner leg portions 42 and 54 are also connected to another common source of air under predetermined pressure to supply a common pressure to various sides of intermediate header 28, while leg portion 38 is directed to a separate source of air under pressure to provide another desired air pressure to central header 30. By utilizing the header and the pressure supply system as disclosed, wherein the corner bells are provided with one pressure, the outer header supplied with another pressure, the intermediate header supplied with a further pressure and the central header supplied with its own pressure, it is possible to control wall thickness and bore size so as to provide dimensional uniformity along the multiple-bore tubing. Although the specific pressures utilized will vary with the size and composition of the tubing being formed, disregarding the corner bells the pressures applied to the various headers generally increase from the outer header inwardly to the central header.

Figure 4:
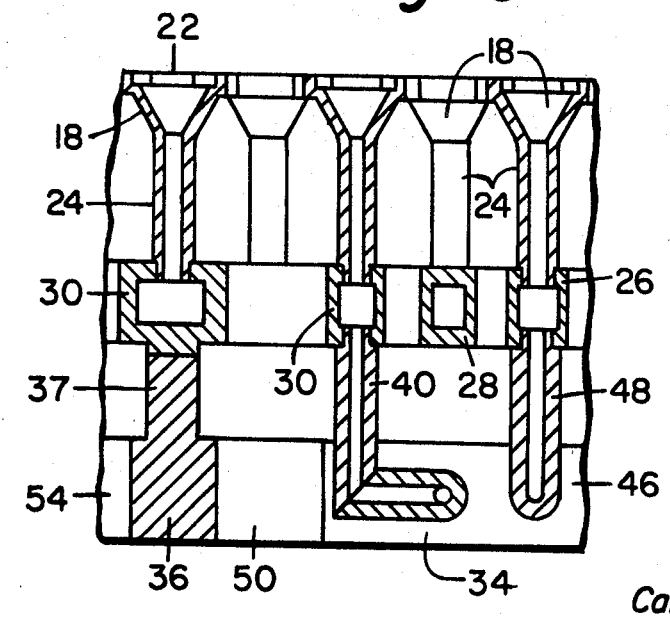
FIG. 4 is an enlarged elevational fragmental view in section taken along line 4—4 of FIG. 1.

The distribution of various air pressures to the different headers is represented more particularly in FIG. 4. Since FIG. 4 is taken along line 4—4 of the top plan view of FIG. 1, which of course is the reverse of the bottom plan view of FIG. 3, certain portions shown in FIG. 3 do not appear in FIG. 4. As shown, the inlet leg portion 46 of support beam 34 supplies air through the offset delivery tube 48 to header 26. Offset delivery tube 40 which communicates with supply leg 38, is shown connected to header 30. The closed-end junction between leg portions 54 and 58 of support beam 36 is shown having a solid depending support connection 37 for facilitating the support of header 30.

As shown in FIGS. 1 and 4, the bells 18 of orifice structure 10 are of a hollow conical shape with the bottom edge formed into a regular hexagon. The interior of the bells is recessed so that the molten glass will flow uniformly off the bell edge and prohibit the wetting or creeping-up of the molten glass within the bell structure, which would produce tubing having thickened walls and decreased hole sizes. In the embodiment shown in FIG. 1, wherein the orifice structure is designed to produce triangular shaped tubing, the bells 18 are arranged in a triangular pattern with the flat sides of all adjacent bells parallel. Thus, the six bells concentrically surrounding any particular bell, form a uniform gap for the molten glass flow about such bell, which provides a thin uniform wall thickness between adjacent bores in the thus formed multi-bore tubing.

As shown particularly in FIGS. 3 and 4, the headers 26, 28 and 30 are symmetrical in plan with respect to the shape of the orifice. In addition the headers may be fabricated of a hermetically welded construction with a hollow rectangular cross section. The concentric triangular orientation of the headers in plan view was selected to permit the manifolding of all of the bells, which are equally distant from the periphery, to the same air pressure. Accordingly, those bells which are at different distances from the periphery are provided with different air pressures, so as to facilitate uniformity in bore size in the formed tubing.

The outer configuration of the multiple-bore tubing may virtually be of any desired polygonal configuration. In such instances the bottom edge of the bells may not all be equal lateral polygons, but rather such edge configuration may be composed of a plurality of polygonal shapes which must maintain a constantly defined gap between the adjacent bells, so as to provide uniformity of wall thickness between the various bores of the multiple-bore tubing. Likewise, a plurality of substantially concentric or symmetrical headers would be utilized to provide equal air supply to those bells which are equally distant from the periphery of the orifice, in the manner similar to that described with respect to the triangular orifice configuration.

Not only is it possible to modify the orifice structure to vary the outer configuration of the resulting multi-bore tubing, but also the number of bells utilized to produce the bores or holes in the multiple-bore tubing may be varied to produce the desired result. As previously stated, the objective of the present invention is to produce multiple-bore tubing having an open frontal area or cross section of from 40 percent to 80 percent with a hole density of at least 200 holes per square inch. The minimum standard may be obtained by producing multiple-bore tubing having hole openings of about 0.05 inch with wall thicknesses of about 0.008 inch, thus resulting in an open frontal area of about 40 percent having approximately 200 holes per square inch.

The stated upper limit of 80 percent open frontal area may be obtained by producing multiple-bore tubing having hole diameters of about 0.005 inch with wall thickness of about 0.001 inch, thus providing a hole density of about 40,000 holes per square inch. A good working example intermediate the two extremes would be obtained by producing multiple-bore tubing having a hole diameter of about 0.03 inch with wall thickness of about 0.0035 inch, thus producing tubing having an open frontal area of between about 75 percent and 80 percent with a hole density of about 1,000 holes per square inch. The bells which produce the multiple bores are preferably positioned in a concentric radially disposed arrangement which produces thin-walled multiple-bore tubing having concentric radially disposed bores with the desired open frontal area and hole density.

FIG. 5 discloses a further embodiment of the invention wherein orifice structure 100 is similar in many respects to orifice structure 10, in that it is composed of an upper support flange 112, sidewalls 114, and a bottom orifice plate 116. However, the orifice structure 100 differs from the orifice structure 10 in that the bells 118 along the periphery of the orifice have been trimmed to produce a flat side along the periphery of the orifice passage. In addition, the bells have been further modified by increasing the size of the peripheral bells 118 from the center of the sides to the corners, with the inner peripheral edge 120 of the bottom orifice plate being contoured to complement the varying size of the peripheral bells 118. Corner bells 119 are also contoured to complement the triangular shape of the orifice, whereas the central bells 117 retain their regular hexagonal configuration.

The modified embodiment of FIG. 5 improves uniformity of hole size in the multiple-bore tubing produced thereby. The bigger bells adjacent the corners of the orifice were utilized to overcome a tendency of small holes being formed in the corner areas of the tubing primarily due to extensive attenuation. The smallest bells adjacent the center portions of the outer periphery effected a reduction in the size of the holes produced in this area, which previously had a tendency to become larger than desired, since this portion of the tubing is virtually unrestricted while still in a semi-molten state immediately after formation. Orifice structure 100 is provided with headers and support beams similar to that disclosed with respect to orifice structure 10, and operates in the same manner.

Referring now to FIG. 6, an orifice structure 10 for forming triangular-shaped tubing is shown connected to a feeder or forehearth 64 by means of upper support flange 12. In practice, the entire orifice structure 10 would be further surrounded and supported by refractory material, which has been omitted for the sake of clarity. Further, since the utilization of the corner supply tubes 62 is optional, they have been omitted in the illustration of FIG. 6.

Figure 8:
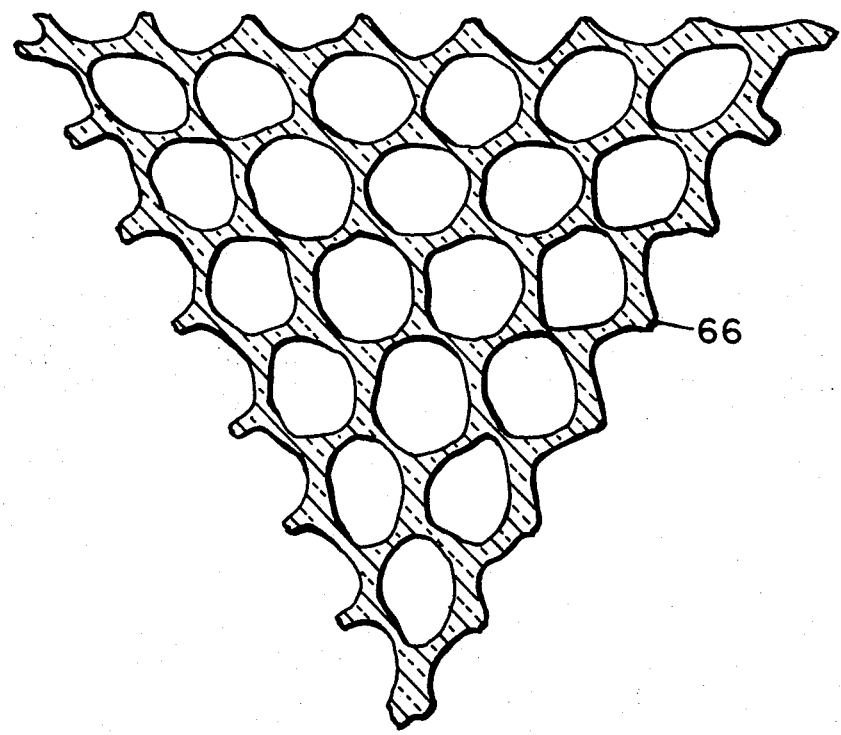
FIG. 8 is a greatly enlarged (about 40 X) fragmental view of an end portion of multi-bore tubing formed by the present invention.

As shown, the flange 12 mates the orifice to a connection on the forehearth 64, and the sidewalls 14 contain the flow of the glass within the orifice structure and direct such flow downwardly between the various bells. The multiple-bore tubing 66 is drawn downwardly similar to a Vello process, such as by a conventional drawing machine, and conveyed along a path by a plurality of rollers or diabolos 68 where it is cut into desired lengths. FIG. 8 shows an end portion of such multiple-bore tubing 66, and illustrates how each internal bore is bounded by a plurality of concentric bores whose wall portions form such internal of interiorly disposed bore.

Although various shapes of flat-sided polygonal bells have been disclosed, improved uniformity in wall thickness between the bores of multi-bore tubing may be obtained by arcuately recessing or scalloping edge portions of the bells. It has been found that with straight sided bells, the intersections of the walls about the various bores in the multiple-bore tubing have a tendency to be thicker than central portions thereof. That is, the wall thickness of glass at the intersection of three adjacent bores in the multi-bore tubing, which corresponds to the interconnected opening between three adjacent bells, tends to be somewhat thicker than it is centrally of such intersection, which central portion, of course, corresponds to the midpoint of the sides of adjacent bells.

In order to overcome this tendency, the sides of adjacent bells are arcuately recessed or scalloped and maintained with a consistently defined spacing therebetween to improve thickness uniformity of the wall portions. Accordingly, more glass is permitted to flow through the central portions between adjacent bells, i.e., intermediate the interconnected intersections, relative to the flow at such intersections per se, to thereby produce relatively uniform wall thicknesses about each bore.

FIG. 7 illustrates such a scalloped bell configuration wherein adjacent hexagonally-shaped bells 217 are provided with arcuate recesses or scalloped portions 218 which complement one another, and are consistently spaced apart relative to each adjacent bell so as to produce improved uniformity in wall thickness of the multi-bore tubing formed thereby.

As a specific illustration, but by no means limiting in nature, a triangular-shaped orifice structure having 45 bells was fabricated from an 80 percent platinum-20 percent rhodium alloy. The bells had a hexagonal configuration with a distance of 0.600 inch from flat to flat, and a uniform spacing of 0.115 inch therebetween. A 48 inch head of molten glass at a viscosity of about 7,000 poises was delivered to the orifice at a rate of about 200 pounds per hour. The central header was supplied with an air flow of 0.17 standard cubic feet per hour with a pressure of 0.34 inch of water column. The intermediate header was supplied with an air flow of 0.35 standard cubic feet per hour at a pressure of 0.33 inch of water column. The outer header was provided with an air flow of 0.48 standard cubic feet per hour with a pressure of 0.25 inch of water column. And the corner bells were provided with an air flow of 0.10 standard cubic feet per hour at a pressure of 0.49 inch water column. Tubing was drawn at the rate of about 800 feet per minute producing triangular shaped multiple-bore tubing having 45 holes with a hole diameter of about 0.020 inch and a wall thickness therebetween of about 0.003 inch, resulting in an open frontal area of approximately 65 percent with a hole density of about 1,900 holes per square inch of cross-sectional area.

As previously pointed out, the particular geometry of the discharge orifice and the arrangement of the bells positioned therein may be varied as desired; however, the manifolding of such bells must maintain a degree of symmetry about a centroid of the orifice in order that uniform bores are formed across the multiple-bore tubing produced by such orifice.

While investigating the various flat-sided configurations which could be utilized, it was determined that the greatest number of holes per unit area of composite matrix is achieved by obtaining the most compact arrangement for a given percent of open frontal area. Since it can be shown geometrically that the most compact arrangements are those having 60° and 120° angles between adjacent sides, with the latter merely being a double multiple of the former, an equilateral triangle orifice construction was chosen as being the basic most compact configuration.

Figure 10:
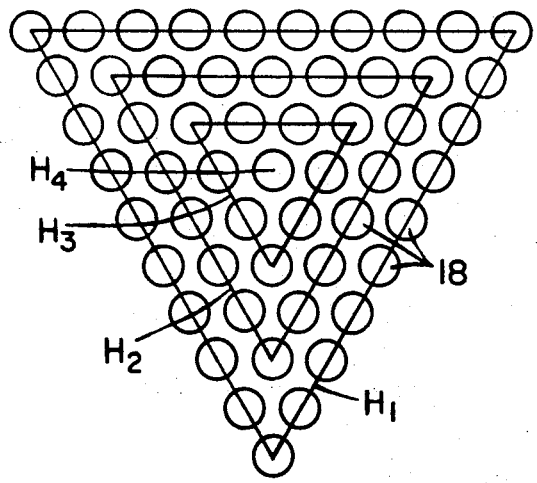
FIGS. 9, 10 and 11, inclusive, schematically illustrate various header arrangements for manifolding different bell configurations embodying the present invention.
Figure 11:
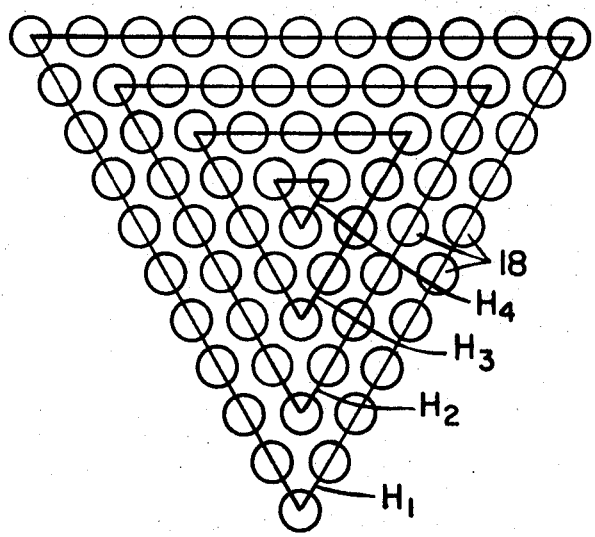
Figure 9:
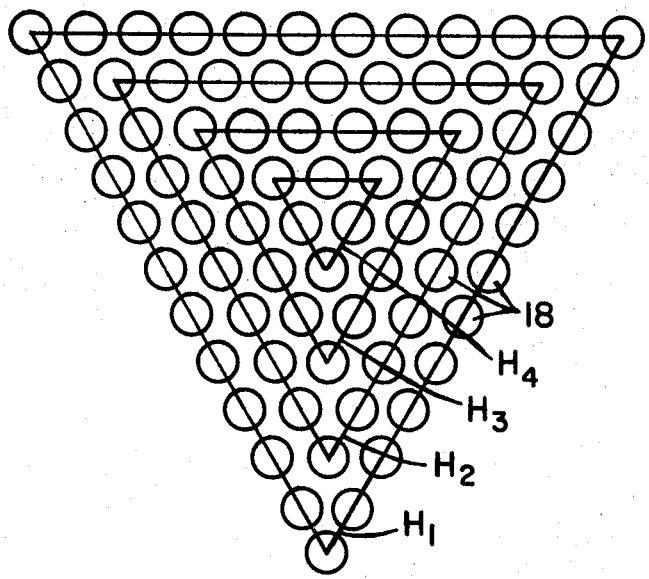

When utilizing an orifice with an equilateral triangular shape, it can be seen that the number of bores or holes which will be formed in the multiple-bore tubing is a function of the number of bells positioned along the peripheral edge of one side of the orifice, assuming that the bells are so arranged that each corner is provided with one bell, and each row extending inwardly therefrom is increased by one bell as shown particularly in FIGS. 9 – 11. The total number N of holes in the multiple-bore tubing formed from such an arrangement having N bells, will then be the sum of the arithmetic series $1 + 2 + 3 + 4 + 5 \ldots + n$, and can be given by the formula $N = n/2 \, (n + 1)$, wherein n is the total number of holes (bells) along one side of the periphery. FIG. 9, for example, has twelve bells along one periphery providing multiple-bore tubing having 78 holes, whereas FIG. 10 has ten bells along one periphery providing multiple-bore tubing having 55 holes.

Under ideal conditions, gas under pressure introduced into each bell would be regulated independently of every other bell, so that the size and wall thickness of each hole could be individually regulated, thereby permitting a correction for all possible variations in the characteristics of the glass stream. However, such an arrangement is neither feasible nor practical since it would be prohibitively difficult and expensive to fabricate, besides being cumbersome to operate, particularly when as many as 300 or more holes are contemplated in the multiple-bore tubing. Further, our investigations indicate that it is generally unnecessary to provide such individual control, since effective control can be obtained by arranging the bells in a concentric or symmetrical manner about an axis through the center of the triangular orifice, which in turn corresponds to the axis of symmetry of the glass delivery system.

As shown in FIGS. 9 – 11, the total number N of bells in the orifice are grouped in triangular arrays which are all concentric or symmetrical with the axis of the centroid of the orifice. As shown, the bells 18 in the outermost triangular array are in communication with a header $H_1$, which supplies a common pressure to all bells in such outer array. In a like manner the bells 18 of the next inner triangular array are in communication with a header $H_2$, connected to another source of fluid pressure, so as to provide all of the bells in such triangular array with a common pressure. The next inner group of bells arranged in a triangular array are also provided with a common header $H_3$, connected to its source of pressure, so as to supply such bells with equal air pressure. Finally, the innermost group of bells is also supplied with a common header $H_4$, in communication with a further pressure supply, in order that the central bells will also have a common pressure.

As noted in the drawings, the central header $H_4$ supplies six bells in the arrangement shown in FIG. 9, one bell in the arrangement shown in FIG. 10, and three bells in the arrangement shown in FIG. 11. While all three arrangements make satisfactory triangular multiple-bore tubing, the arrangement shown in FIG. 9 has the advantage of providing the greatest number of holes for a given number of pressure manifolds or headers. It thus can be seen that in a triangular configuration, a variety of satisfactory bell arrangements may be utilized as long as symmetrical arrays of such bells, commencing from the periphery and extending inwardly thereof, are each individually manifolded with their own pressure source.

Although we have shown the now preferred embodiments of our invention it will be apparent to those skilled in the art that various changes and modifications may be made thereto without departing from the spirit and scope of the invention as defined in the appended claims.

We claim:

1. Apparatus for forming multi-bore tubing comprising, means for directing a downward flow of molten glass having an upwardly-open inlet end for receiving such molten glass, a discharge passage adjacent the lower end of said directing means, a plurality of spaced-apart bell means fixedly positioned within said discharge passage, a plurality of header means within said discharge passage and above an outlet end of said bell means for supplying air under pressure to said plurality of bell means, a plurality of said header means each supplying air to an individual array of bell means composed of a plurality of hollow bell members, and means for providing a separate source of air under pressure to each individual header means within said discharge passage such that all of the hollow bell members within any given array of bell means will be provided with the same air pressure.

2. Apparatus as defined in claim 1 wherein said bell means includes a plurality of hollow members having a bottom face with a polygonal configuration, a hollow bell shaft individually connecting each of said hollow members to one of said header means, and adjacent edges on the polygonal face of adjacent bell means being of a consistent configuration and spaced-apart to provide multiple-bore tubing with uniform wall thickness between the bores.

3. Apparatus as defined in claim 1 wherein said bell means includes a plurality of polygonal bell members having arcuately recessed edge portions providing consistently defined spacings between adjacent bells for forming multiple-bore tubing with uniform wall thicknesses between the bores.

4. Apparatus for forming multiple-bore tubing as defined in claim 1 wherein a plurality of said bell means are concentrically arranged, and edge portions of surrounding bells define wall thicknesses for the bore formed by an interior bell.

5. Apparatus for forming multiple-bore tubing as defined in claim 1 including a bottom orifice plate connected to the lower end of said directing means and forming and outer periphery of said discharge passage, said orifice plate having an inner periphery defining the outer contour of the multiple-bore tubing formed by said apparatus, and ridge means bounding said inner periphery to facilitate the downward flow of the molten glass from the discharge orifice passage.

6. Apparatus for forming multiple-bore tubing as defined in claim 1 wherein said plurality of spaced-apart bell means includes a plurality of independently supported bell members having polygonal lower face portions, and a majority of said polygonal face portions being hexagonal.

7. Apparatus for forming multiple-bore tubing as defined in claim 1 wherein said discharge passage is provided with a bounding periphery wall defining the outer configuration of the tubing passed therethrough, said plurality of spaced-apart bell means arranged inwardly from said bounding peripheral wall, and each of said plurality of header means supplying a substantially uniform air pressure to a symmetrical arrangement of said plurality of bells with one symmetrical arrangement equally distant from the bounding peripheral wall receiving one pressure and another symmetrical arrangement positioned inwardly from said bounding peripheral wall receiving a different pressure.

8. Apparatus as defined in claim 1 wherein said bell means are symmetrically arranged inwardly from a periphery of said discharge passage, and said header means are individually connected to separate symmetrical groups of bell means to provide varying pressures thereto depending upon the positionment from the periphery.

9. Apparatus for forming multiple-bore tubing as defined in claim 1 wherein said means for providing a separate source of air under pressure to each individual header means includes a plurality of hollow support beams which both support said plurality of header means and supply separate sources of air to the individual header means.

10. Apparatus for forming multiple-bore tubing as defined in claim 1 wherein said discharge passage is of a triangular shape, and separate fluid supply conduits provide a separate source of air to bell means positioned in the corner of said triangular configuration.

11. Apparatus for forming multiple-bore tubing as defined in claim 1 wherein each of said plurality of bell means includes a hollow conical body member having a lower face with a regular hexagonal configuration, and each said bell means being spaced-apart with the flat of each hexagon being equally spaced from the flat of each adjacent hexagon to form multiple-bore tubing with substantially uniform wall thicknesses.

12. In apparatus for forming multiple-bore tubing by flowing molten glass downwardly through an orifice structure, the improvement comprising, a discharge orifice, means bounding said discharge orifice and defining both the periphery of said orifice and the outer configuration of tubing to be formed thereby, a plurality of bells fixedly positioned within said discharge orifice in symmetrical arrays complementing the periphery of said orifice, the bells making up each individual symmetrical array thereof being positioned substantially equally distant from the periphery of said discharge orifice, and header means for supplying different air pressures to each symmetrical array of said bells so that all of the bells in one array will be provided with a common air pressure and those in another array of bells will be provided with a different air pressure.

13. In apparatus as defined in claim 12 the improvement comprising, said orifice bounding means having a triangular configuration, and a triangular arrangement of bells complementing said triangular orifice bounding means with the total number of bells N within the orifice structure being defined by the formula $N = n/2\,(n + 1)$, where $n =$ the number of bells along one side of said means bounding said discharge orifice.

14. In apparatus as defined in claim 13 the improvement comprising a plurality of concentric triangular-shaped header means complementing said orifice bounding means for manifolding the various symmetrical arrays of bells, and said plurality of triangular header means being equally spaced apart.

* * * * *